(12) United States Patent
Greaves

(10) Patent No.: US 7,959,165 B2
(45) Date of Patent: Jun. 14, 2011

(54) SUSPENSION SYSTEM RUN HEIGHT ADJUSTMENT

(75) Inventor: Todd Greaves, Anna, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 267 days.

(21) Appl. No.: 12/326,837

(22) Filed: Dec. 2, 2008

(65) Prior Publication Data

US 2010/0133764 A1 Jun. 3, 2010

(51) Int. Cl.
*B60G 17/056* (2006.01)
(52) U.S. Cl. ........... 280/6.157; 280/5.514; 280/124.117; 267/64.16; 267/DIG. 1
(58) Field of Classification Search ............... 280/6.157, 280/6.16, 5.506, 6.159, 5.514, 124.117, 124.121; 267/64.16, 64.17, DIG. 1; 137/625.15, 625.21
See application file for complete search history.

(56) References Cited

U.S. PATENT DOCUMENTS

| | | | |
|---|---|---|---|
| 2,338,897 A * | 1/1944 | Boulogne et al. | 267/186 |
| 2,353,503 A * | 7/1944 | Rost et al. | 280/5.509 |
| 3,558,123 A * | 1/1971 | Yew | 267/34 |
| 3,599,955 A * | 8/1971 | Yew | 267/44 |
| 4,050,710 A * | 9/1977 | Flaig | 280/6.16 |
| 4,195,863 A * | 4/1980 | Richardson | 280/86.751 |
| 4,974,861 A * | 12/1990 | Itoh et al. | 280/6.158 |
| 5,207,444 A | 5/1993 | Tydeman | |
| 6,036,200 A * | 3/2000 | Kim | 280/5.506 |
| 7,028,996 B2 * | 4/2006 | Plath | 267/64.17 |
| 7,104,548 B2 * | 9/2006 | Ichimura et al. | 280/6.154 |
| 2007/0170685 A1 | 7/2007 | Chalin et al. | |

OTHER PUBLICATIONS

York Tecair 1 Air Suspension manual, Dec. 2004, 12 pages.
Picture of suspension system, Dallas Truck Show 2008, 1 page.

* cited by examiner

*Primary Examiner* — Paul N Dickson
*Assistant Examiner* — Timothy D Wilhelm
(74) *Attorney, Agent, or Firm* — Smith IP Services, P.C.

(57) ABSTRACT

A method of adjusting a suspension run height includes: pivotably mounting a leveling valve to a hanger bracket; attaching an indicator arm to a suspension component which displaces relative to the hanger bracket; and pivoting the leveling valve relative to the hanger bracket to thereby adjust the run height of the frame relative to the suspension component. A run height adjustment system includes: a leveling valve having a leveling arm pivotably mounted thereto at a first pivot, and an indicator arm being pivotably mounted to the leveling arm at a second pivot; an adjustment lever for pivoting the leveling valve about a third pivot; and the third pivot being positioned longitudinally between the first and second pivots. Another run height adjustment system includes: a leveling arm pivotably mounted to a leveling valve; an adjustment lever for pivoting the leveling valve; and the adjustment lever pivotably mounted to a hanger bracket.

20 Claims, 8 Drawing Sheets

SUSPENSION SYSTEM RUN HEIGHT ADJUSTMENT

BACKGROUND

The present disclosure relates generally to vehicle suspension systems and, in an embodiment described herein, more particularly provides a suspension system run height adjustment.

It is known to set a run height (generally defined as the distance between a vehicle frame and an axle or spindle center) of a suspension system by use of a leveling valve. The leveling valve maintains a desired run height by bleeding pressure from, or supplying pressure to, air springs of the suspension system to thereby raise or lower the frame as needed.

There are many circumstances, however, when it is beneficial to be able to adjust the run height to a new value, rather than to maintain a constant run height. For example, it may be desired to raise or lower a trailer bed relative to a loading dock, it may be desired to lower a trailer so that it (and/or a cargo on the trailer) will pass under a bridge, etc. In these circumstances, it has been common practice to override the leveling valve and directly bleed or supply pressure directly to the air springs as needed to adjust the run height. Unfortunately, the leveling valve is frequently not re-activated after it is overridden, which can lead to damage to the vehicle suspension.

In addition, the leveling valve is commonly mounted to the vehicle frame by the vehicle manufacturer, and not by the suspension system manufacturer, so the suspension system manufacturer cannot reliably control the placement of the leveling valve. Consequently, the leveling valve can be installed in a position which is not optimum for the suspension system.

Furthermore, the use of turntable suspensions has become more common in recent years. Unfortunately, a convenient and reliable method for adjusting the run height for a turntable suspension is not yet available.

Therefore, it may be seen that improvements are needed in the art of suspension system run height adjustment. These improvements may be useful in turntable and other types of suspension systems.

SUMMARY

In the present specification, a run height adjustment system and associated method are provided which solve at least one problem in the art. One example is described below in which a leveling valve is pivotably mounted to a hanger bracket of a suspension system. Another example is described below in which the hanger bracket is pivotable about a vertical axis relative to a vehicle frame.

In one aspect, a suspension run height adjustment system is provided. The system includes a leveling valve having a leveling arm pivotably mounted thereto at a first pivot. An indicator arm is pivotably mounted to the leveling arm at a second pivot. An adjustment lever is operative to pivot the leveling valve about a third pivot. The third pivot is positioned longitudinally between the first and second pivots.

In another aspect, a method of adjusting a run height of a vehicle suspension is provided which includes the steps of: pivotably mounting a leveling valve to a hanger bracket of the suspension; attaching an indicator arm to a component of the suspension which displaces relative to the hanger bracket; and pivoting the leveling valve relative to the hanger bracket to thereby adjust the run height of the frame relative to the suspension component.

In yet another aspect, a suspension run height adjustment system is provided which includes a leveling valve having a leveling arm pivotably mounted thereto, an adjustment lever operative to pivot the leveling valve, and a hanger bracket. The adjustment lever is pivotably mounted to the hanger bracket.

These and other features, advantages and benefits will become apparent to one of ordinary skill in the art upon careful consideration of the detailed description of representative embodiments below and the accompanying drawings, in which similar elements are indicated in the various figures using the same reference numbers.

DETAILED DESCRIPTION

Figure 1:
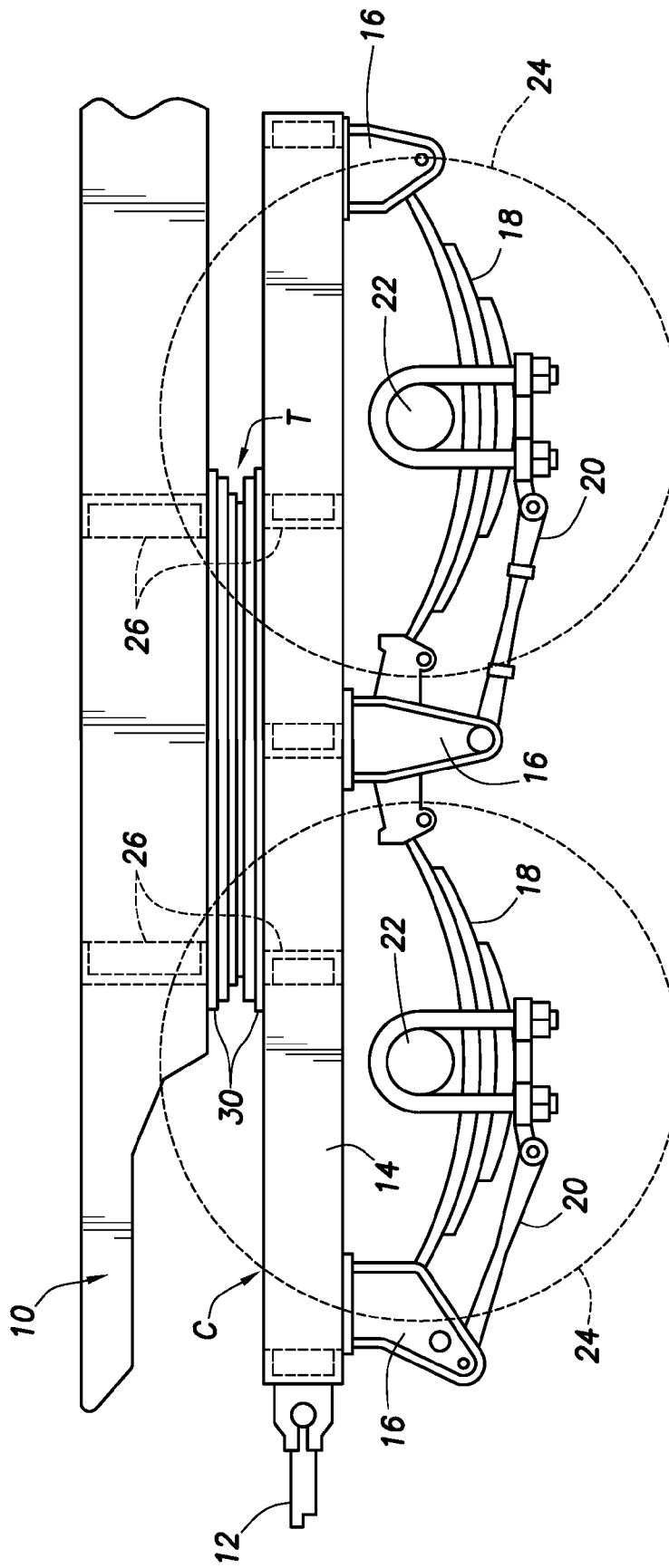
FIG. 1 is a side elevational view of a prior art turntable suspension system.

Representatively illustrated in FIG. 1 is a prior art turntable suspension system. The suspension system is merely an example of a type of suspension which may be improved upon using the principles of the present disclosure, but it should be clearly understood that it is not necessary for those principles to be used in conjunction with the suspension system of FIG. 1 or any other particular type of vehicle suspension. Instead, the principles of this disclosure may be used with any type of vehicle suspension.

FIG. 1 illustrates a side view of the front end of a conventional trailer frame 10 having a pair of longitudinally extending, parallel frame rails supporting a conventional steerable front wheel carriage C through a steering turntable T. The front wheel carriage C shown mounts a conventional dual axle suspension assembly and a typical drawbar 12 which hitches at its opposite end to the rear of a towing vehicle or trailer. Alternatively, a conventional tractor-trailer hitch may be used in place of the drawbar 12.

The steering carriage C includes a frame structure 14, suspension spring mounts 16, leaf springs 18, stabilizers 20, axles 22 and wheels 24. Typically, both the trailer frame rails 10 and the carriage frame rails 14 mount laterally extending transverse cross members 26 for strength and stability. Although a dual axle front steering assembly is shown in FIG.

1, a single front axle or a rear axle steering assembly may alternatively be provided as well.

Note that no run height adjustment is provided for in the turntable suspension system of FIG. 1.

Figure 2:
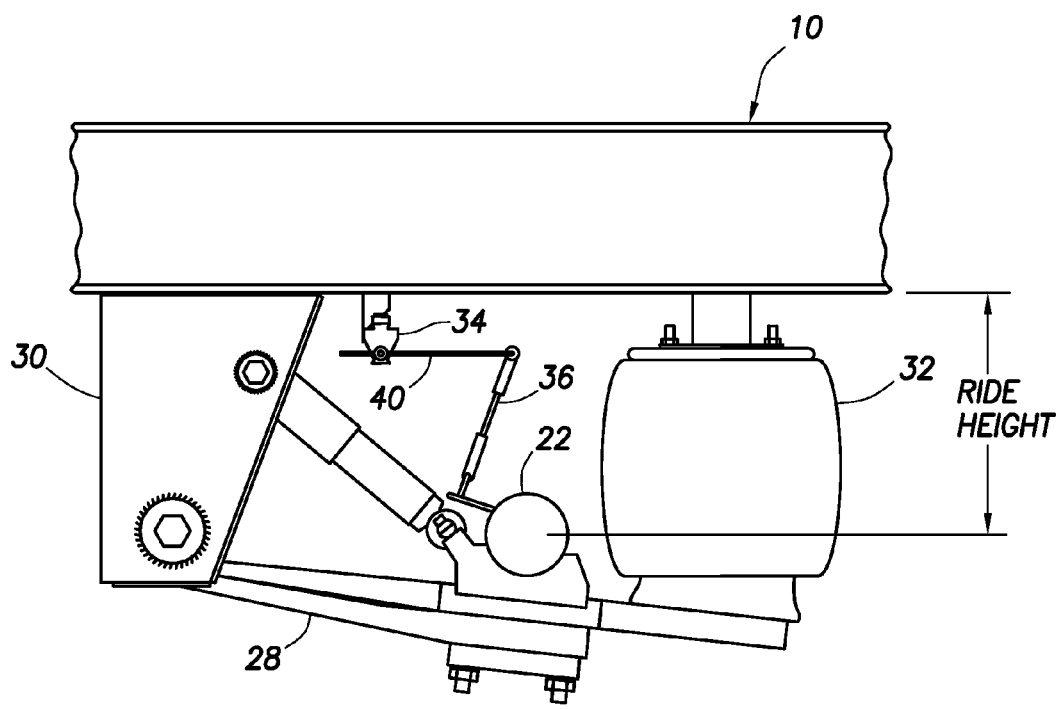
FIG. 2 is a side elevational view of a prior art suspension system.

Referring additionally now to FIG. 2, another prior art suspension system is depicted. The suspension system of FIG. 2 is of the type known to those skilled in the art as a spring beam suspension, since a spring beam 28 is used to pivotably attach the axle 22 to a hanger bracket 30 extending downwardly from the frame 10. An air spring 32 biases the frame 10 upward relative to the spring beam 28.

The suspension system of FIG. 2 also includes a leveling valve 34 attached to the frame 10 for maintaining a desired run or ride height. The leveling valve 34 bleeds air pressure from, or supplies air pressure to, the air spring 32 as needed to maintain the desired run height.

Figure 3:
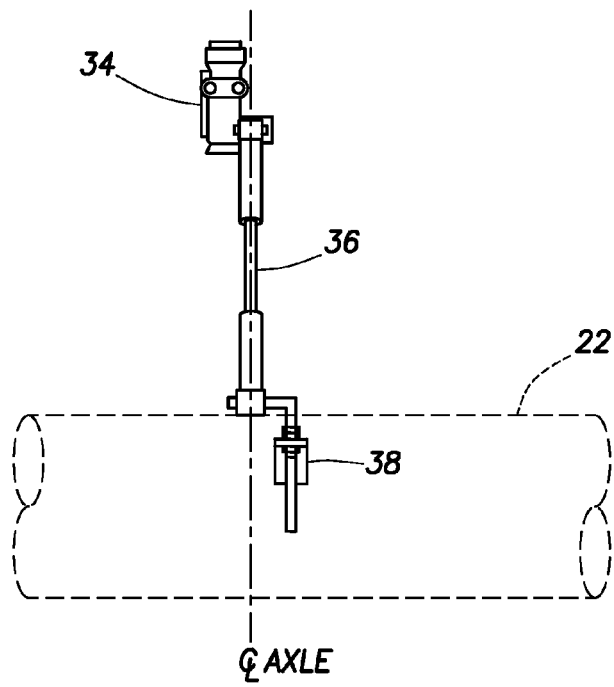
FIG. 3 is a front elevational view of a leveling valve in the suspension system of FIG. 2.

A front elevational view of the leveling valve 34 is depicted in FIG. 3. Note that an indicator arm 36 is attached to the axle 22 at a center of the axle via a bracket 38. In FIG. 2, it may be seen that the indicator arm 36 is pivotably attached to a leveling arm 40 which, in turn, is pivotably attached to the leveling valve 34.

As the axle 22 displaces relative to the frame 10, the leveling valve 34 will maintain a substantially consistent run height of the suspension system. However, note that it would be very inconvenient to adjust the run height of the suspension system, for to do so an operator would have to crawl under the frame 10 and either mount the leveling valve 34 to the frame at another location or orientation, or the operator would have to adjust the geometry of the indicator arm 36/bracket 38/leveling arm 40 configuration. Even if such an adjustment were made, it would likely leave the leveling valve 34 or its various components in a less than optimum configuration for use with the suspension system, which could result in damage to one or more of the suspension components.

Consequently, such run height adjustments would not normally be made in the suspension system of FIG. 2, and if such adjustments were made, they could not be conveniently reversed. Thus, an operator is likely to forget to return the run height to its proper level which, again, can result in damage to one or more of the suspension components.

Furthermore, note that the configuration of the leveling valve 34 being attached to the frame 10 substantially prevents the suspension system manufacturer from controlling the leveling valve placement, since the leveling valve will be attached to the frame by the vehicle manufacturer, instead of by the suspension system manufacturer. In addition, the configuration of the leveling valve 34 being attached to the frame 10 is unusable with the suspension system of FIG. 1, because the suspension system pivots relative to the frame 10.

Figure 4:
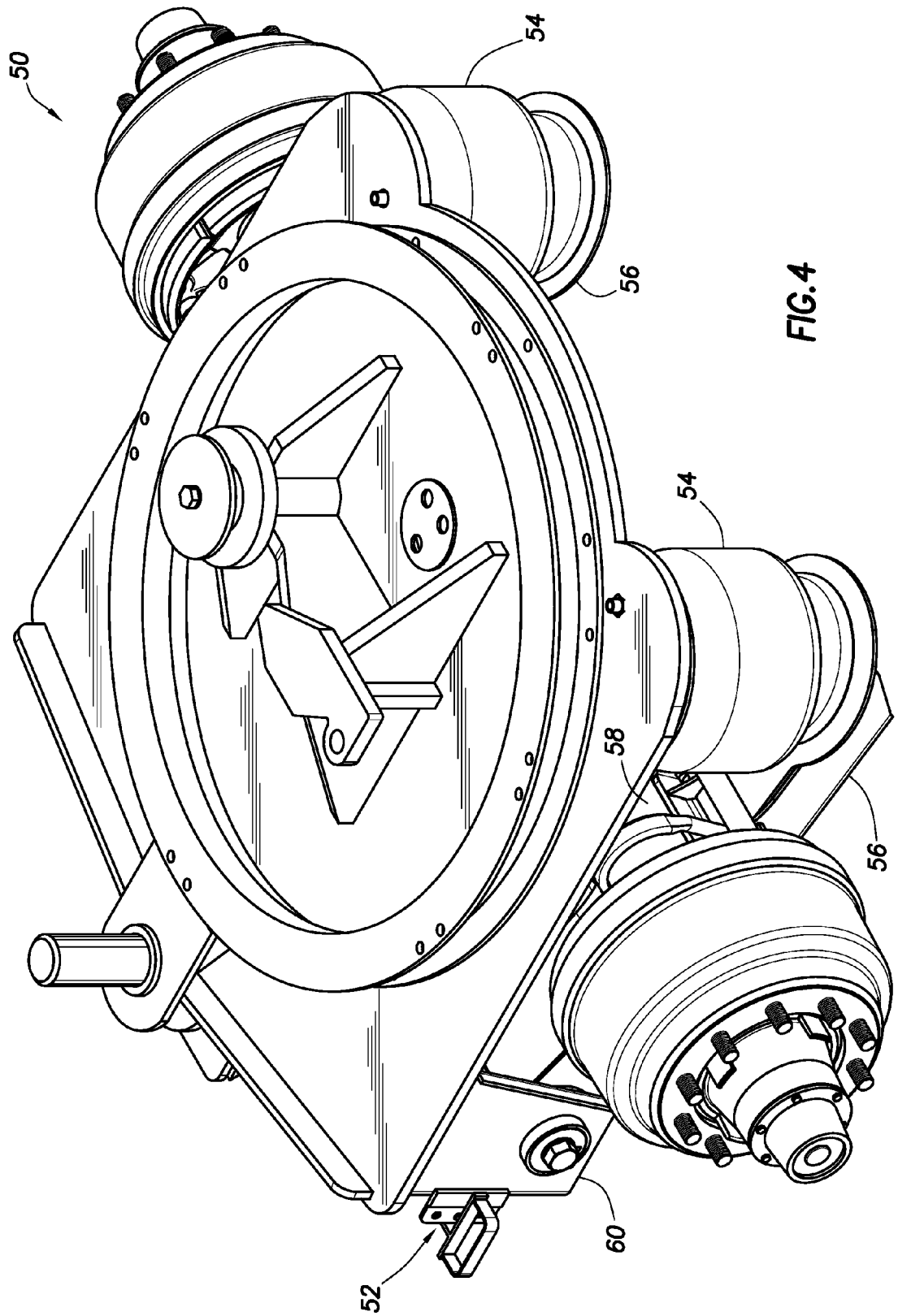
FIG. 4 is an isometric view of a turntable suspension incorporating a run height adjustment system embodying principles of the present disclosure.

Referring additionally now to FIG. 4, a suspension system 50 which includes a run height adjustment system 52 embodying principles of the present disclosure is representatively illustrated. Although the suspension system 50 is depicted as being a turntable-type suspension system, this embodiment is described merely as an example of a useful application of the principles of the disclosure, which principles are not limited to any specific details of this embodiment.

Figure 5:
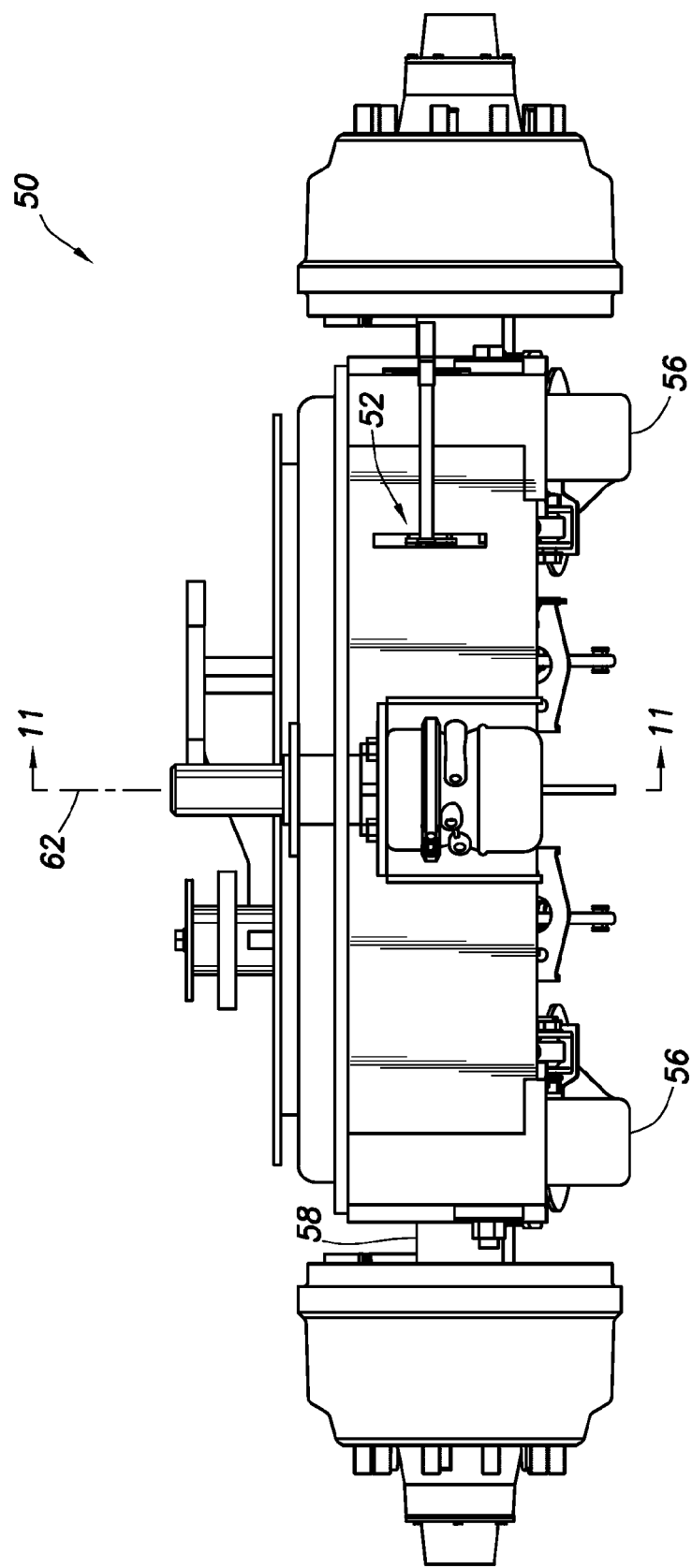
FIG. 5 is a front elevational view of the suspension of FIG. 4.
Figure 6:
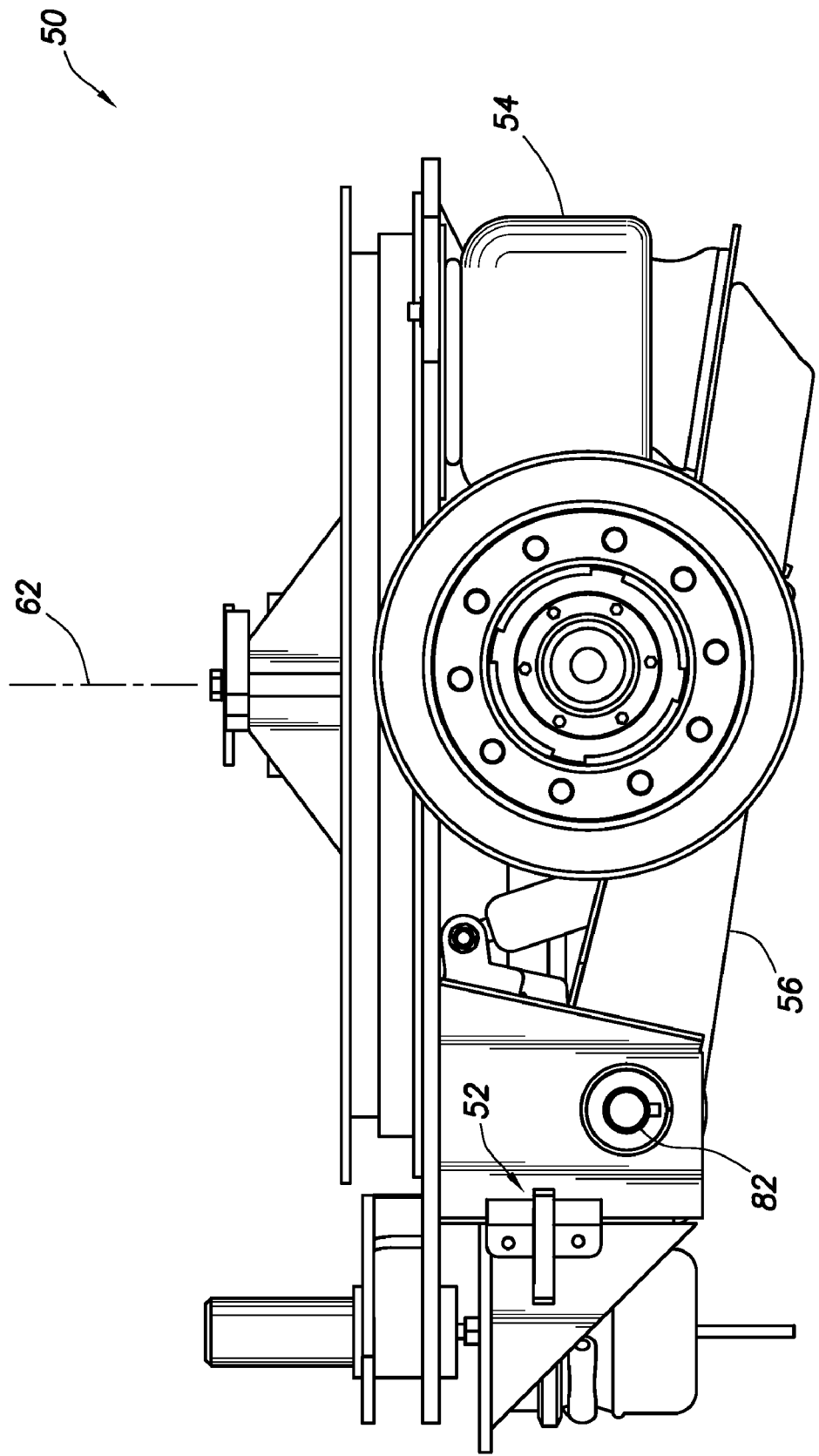
FIG. 6 is a side elevational view of the suspension.
Figure 11:
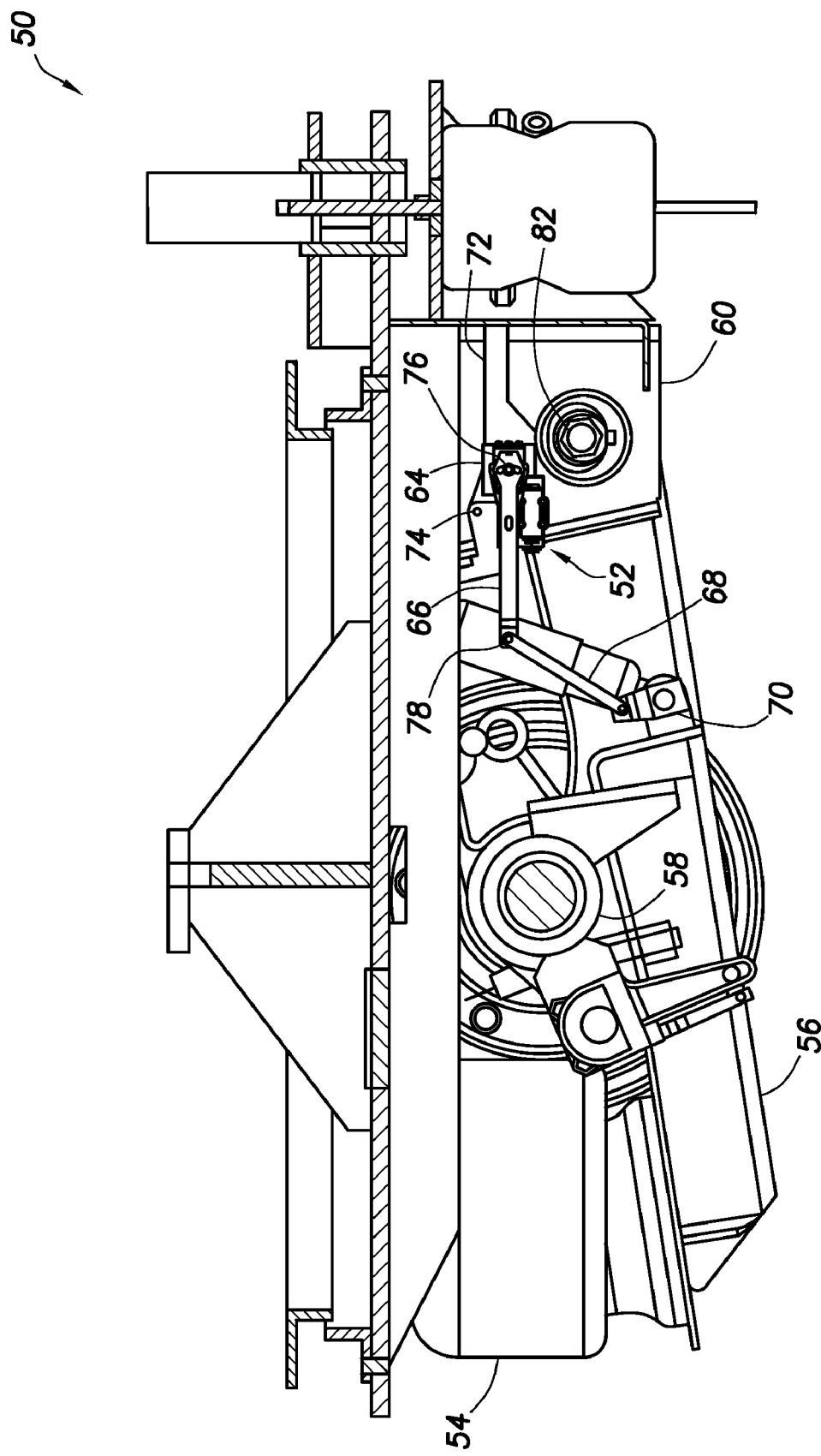
FIG. 11 is a cross-sectional view of the suspension, taken along line 11-11 of FIG. 5.

The suspension system 50 is further illustrated in FIGS. 5, 6 & 11. In these views it may be seen that the suspension system 50 includes air springs 54, suspension arms 56, an axle 58 and hanger brackets 60. The suspension system 50 and its individual components are mounted so that they are pivotable about a vertical axis 62 relative to a vehicle frame (such as the frame 10 described above).

The run height adjustment system 52 includes a leveling valve 64 with a leveling arm 66 and an indicator arm 68. The leveling valve 64 is pivotably attached to an inner side of one of the hanger brackets 60, and the indicator arm 68 is attached to a suspension component (such as one of the suspension arms 56) via a bracket 70.

As the suspension arm 68 displaces relative to the hanger bracket 60, the leveling valve 64 operates to supply air pressure to, or bleed air pressure from, the air springs 54 to maintain a desired run height of the suspension. In one beneficial feature of the system 52, the run height may be conveniently and easily adjusted by pivoting the leveling valve 64 relative to the hanger bracket 60. In another beneficial feature of the system 52, this pivoting is accomplished using a configuration of pivots which is conducive to making accurate and useful run height adjustments. In yet another beneficial feature of the system 52, such run height adjustments can be conveniently made, even though the suspension system 50 may rotate relative to a vehicle frame to which it is mounted.

Figure 7:
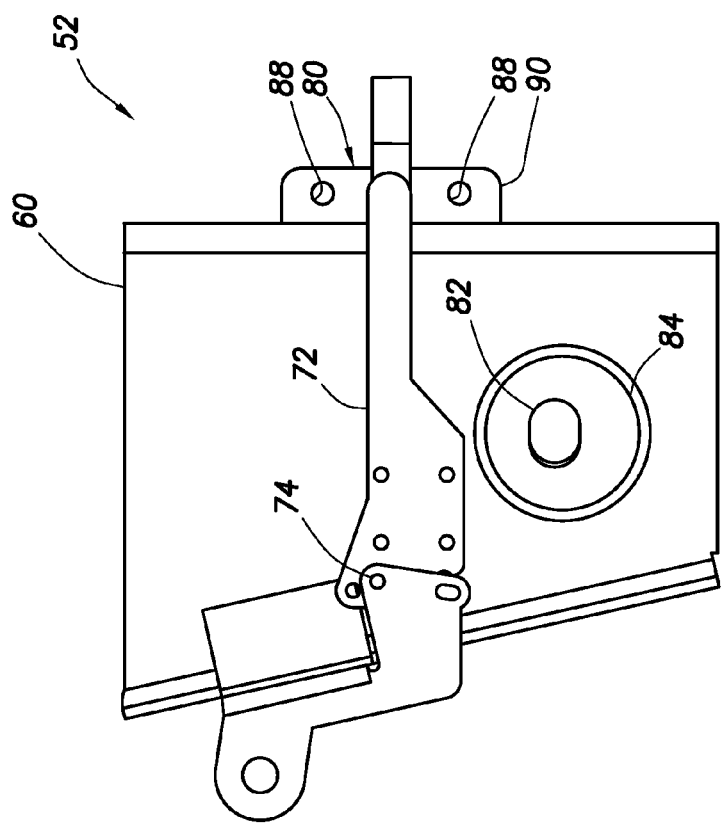
FIG. 7 is a side elevational view of the run height adjustment system as mounted to an inner side of a hanger bracket.

A somewhat enlarged view of the inner side of the hanger bracket 60 is representatively illustrated in FIG. 7, with the leveling valve 64 being pivotably mounted thereon. An adjustment lever 72 is used to pivot the leveling valve 64 relative to the hanger bracket 60.

Figure 8:
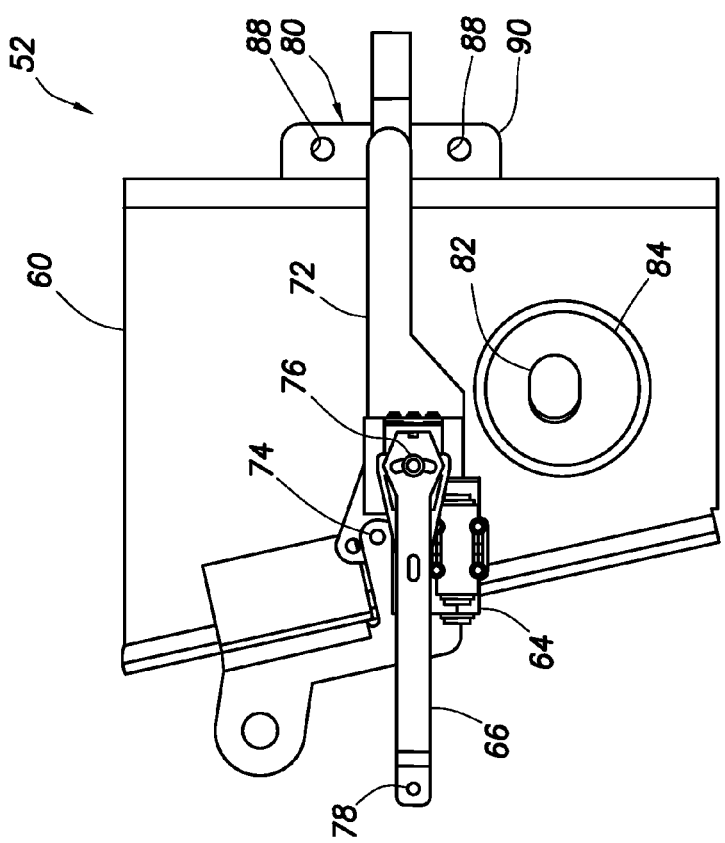
FIG. 8 is a side elevational view of the run height adjustment system with a leveling valve thereof removed.

In FIG. 8, the adjustment lever 72 is depicted on the hanger bracket 60, with the leveling valve 64 removed. In this view, the manner in which the adjustment lever 72 pivots relative to the hanger bracket 60 about a pivot 74 can be more clearly seen.

Returning to FIG. 7, note that the leveling arm 66 is pivotable relative to the leveling valve 64 at a pivot 76, and that the indicator arm 68 is pivotable relative to the leveling arm at a pivot 78. Preferably, the pivot 74 is positioned longitudinally (i.e., orthogonal to the axle 58 and left to right in the view of FIG. 7) between the other two pivots 76, 78.

This arrangement is conducive to making accurate and useful run height adjustments, as discussed above, at least in part because appropriate displacements of the lever arm 72 by a detent mechanism 80 on an outer side of the hanger bracket 60 will produce desirable run height adjustments due to corresponding pivoting of the leveling valve 64 about the pivot 74. However, other arrangements of the pivots 74, 76, 78 may be used, if desired.

It should also be recognized that the pivots 74, 76, 78 are positioned on the hanger bracket 60 vertically above a pivot 82 which pivotably mounts the suspension arm 56 to the hanger bracket. In this example, the pivot 82 is formed in part by a bushing 84 which permits some articulation of the suspension arm 56. However, other types of pivots may be used, if desired (for example, the pivot for the spring beam 28 as depicted in FIG. 2).

Figure 10:
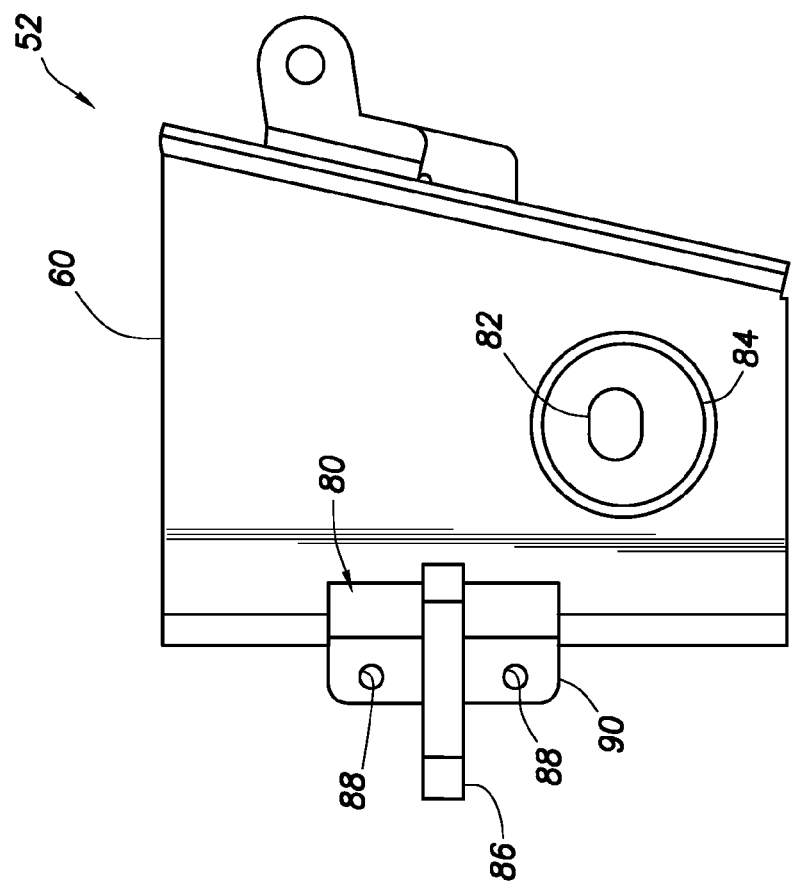
FIG. 10 is a side elevational view of the run height adjustment system from an outer side of the hanger bracket.
Figure 9:
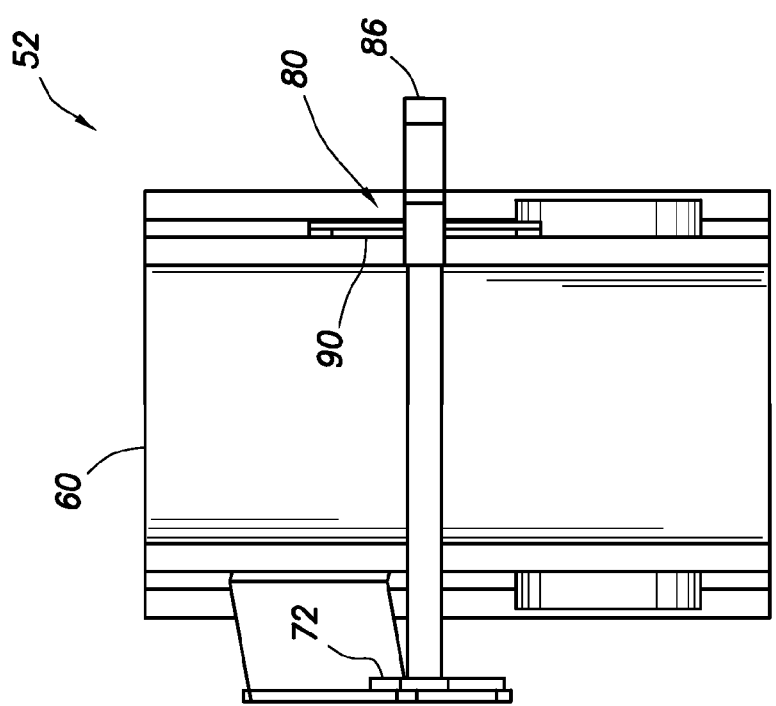
FIG. 9 is a front elevational view of the run height adjustment system.

The detent mechanism 80 can be most easily viewed from a front and a side view in FIGS. 9 & 10. In these views it may be seen that the detent mechanism 80 includes a handle 86 having a pin on an inner side thereof (not visible in the drawings) which selectively engages any one of three holes 88 formed through a plate 90 attached to the hanger bracket 60. A middle one of the holes 88 is not visible in the drawings, since the pin on the handle 86 is engaged with the middle hole.

The holes 88 may correspond to positions of the leveling valve 64 which produce normal, elevated and lowered run heights of the suspension system 50. For example, in normal operations the handle pin may be engaged with the middle hole 88 to produce a normal run height, the handle pin may be engaged with the upper hole to produce an elevated run height (e.g., to align a trailer bed with a loading dock, etc.), and the handle pin may be engaged with the lower hole to produce a lowered run height (e.g., to permit the trailer and its cargo to pass under a bridge, etc.). Of course, other positions, other numbers of positions, and other types of detent mechanisms may be used in place of the detent mechanism 80 in keeping with the principles of this disclosure.

Note that the detent mechanism 80 for adjusting the run height is conveniently positioned at the outer side of the hanger bracket 60, where it is easily accessible by an operator. Thus, the run height is conveniently adjusted, the operator is much more likely to return the run height to its normal setting after it has been altered, and the adjustment does not require that the leveling valve 64 be bypassed or otherwise disabled.

It may now be fully appreciated that the above disclosure provides many advancements to the art of run height adjustment in vehicle suspension systems. In particular, the run height adjustment system 52 described above is much more convenient to use than prior systems, and has the leveling valve 64 mounted to the hanger bracket 60, where its placement can be controlled by the suspension system manufacturer, instead of being mounted to the vehicle frame which is controlled by the vehicle manufacturer. The run height adjustment system 52 is also applicable to a variety of different suspension systems, such as turntable, spring beam, trailing arm, parallelogram or modified parallelogram suspension systems, etc.

The above disclosure provides a suspension run height adjustment system 52 which includes a leveling valve 64 having a leveling arm 66 pivotably mounted thereto at a first pivot 76, and an indicator arm 68 pivotably mounted to the leveling arm 66 at a second pivot 78. An adjustment lever 72 is operative to pivot the leveling valve 64 about a third pivot 74. The third pivot 74 is positioned longitudinally between the first and second pivots 76, 78.

The adjustment lever 72 may be pivotably mounted to a hanger bracket 60 at the third pivot 74. The adjustment lever 72 may be mounted to an inner side of the hanger bracket 60, and a detent mechanism 80 may be mounted to an outer side of the hanger bracket 60. The detent mechanism 80 may releasably secure the adjustment lever 72 at multiple predefined positions relative to the hanger bracket 60.

A suspension arm 56 may pivotably connect an axle 58 to the hanger bracket 60 at a fourth pivot 82. The third pivot 74 may be positioned vertically above the fourth pivot 82.

The hanger bracket 60 may be pivotable about a vertical axis 62 relative to a vehicle frame 10. The leveling valve 64 may be pivotable about the vertical axis 62 relative to the vehicle frame 10.

Also described by the above disclosure is a suspension run height adjustment system 52 which includes a leveling valve 64 having a leveling arm 66 pivotably mounted thereto, an adjustment lever 72 operative to pivot the leveling valve 64, and a hanger bracket 60. The adjustment lever 72 is pivotably mounted to the hanger bracket 60.

The above disclosure also provides a method of adjusting a run height of a vehicle suspension 50, with the method including the steps of: pivotably mounting a leveling valve 64 to a hanger bracket 60 of the suspension 50; attaching an indicator arm 68 to a component of the suspension (e.g., the arm 56) which displaces relative to the hanger bracket 60; and pivoting the leveling valve 64 relative to the hanger bracket 60 to thereby adjust the run height of the suspension 50.

The attaching step may include attaching the indicator arm 68 to the suspension component which is pivotable about a vertical axis 62 relative to the vehicle frame 10.

The hanger bracket 60 may be pivotable about a vertical axis 62 relative to the vehicle frame 10 in the pivotably mounting step.

A leveling arm 66 may be pivotably mounted to the leveling valve 64 at a first pivot 76, with the indicator arm 68 pivoting relative to the leveling arm 66 at a second pivot 78, and the leveling valve 64 may be pivotable relative to the hanger bracket 60 about a third pivot 74 which is positioned longitudinally between the first and second pivots 76, 78.

The method may include mounting the leveling valve 64 to an inner side of the hanger bracket 60. The pivoting step may include operating a detent mechanism 80 mounted to an outer side of the hanger bracket 60, thereby selecting from among multiple predefined positions of the leveling valve 64 relative to the hanger bracket 60.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A suspension run height adjustment system, comprising:
   a leveling valve having a leveling arm pivotably mounted thereto at a first pivot, and an indicator arm being pivotably mounted to the leveling arm at a second pivot;
   an adjustment lever operative to pivot the leveling valve about a third pivot; and
   the third pivot being positioned longitudinally between the first and second pivots.

2. The system of claim 1, wherein the adjustment lever is pivotably mounted to a hanger bracket at the third pivot.

3. The system of claim 2, wherein the adjustment lever is mounted to an inner side of the hanger bracket, and wherein a detent mechanism is mounted to an outer side of the hanger bracket.

4. The system of claim 3, wherein the detent mechanism releasably secures the adjustment lever at multiple predefined positions relative to the hanger bracket.

5. The system of claim 2, wherein a suspension arm pivotably connects an axle to the hanger bracket at a fourth pivot, and wherein the third pivot is positioned vertically above the fourth pivot.

6. The system of claim 2, wherein the hanger bracket is pivotable about a vertical axis relative to a vehicle frame.

7. The system of claim 6, wherein the leveling valve is pivotable about the vertical axis relative to the vehicle frame.

8. A suspension run height adjustment system, comprising:
   a leveling valve having a leveling arm pivotably mounted thereto;
   an adjustment lever operative to pivot the leveling valve; and
   a hanger bracket, the adjustment lever being pivotably mounted to the hanger bracket.

9. The system of claim 8, wherein:
   the leveling arm is pivotably mounted to the leveling valve at a first pivot, and an indicator arm is pivotably mounted to the leveling arm at a second pivot;
   the adjustment lever is operative to pivot the leveling valve about a third pivot; and
   the third pivot is positioned longitudinally between the first and second pivots.

10. The system of claim 9, wherein the adjustment lever is pivotably mounted to the hanger bracket at the third pivot.

11. The system of claim 9, wherein a suspension arm pivotably connects an axle to the hanger bracket at a fourth pivot, and wherein the third pivot is positioned vertically above the fourth pivot.

12. The system of claim 8, wherein the adjustment lever is mounted to an inner side of the hanger bracket, and wherein a detent mechanism is mounted to an outer side of the hanger bracket.

13. The system of claim 12, wherein the detent mechanism releasably secures the adjustment lever at multiple predefined positions relative to the hanger bracket.

14. The system of claim 8, wherein the hanger bracket is pivotable about a vertical axis relative to a vehicle frame.

15. The system of claim 14, wherein the leveling valve is pivotable about the vertical axis relative to the vehicle frame.

16. A method of adjusting a run height of a vehicle suspension, the method comprising the steps of:
pivotably mounting a leveling valve to a hanger bracket of the suspension;
attaching an indicator arm to a component of the suspension which displaces relative to the hanger bracket; and
pivoting the leveling valve relative to the hanger bracket to thereby adjust the run height of the suspension.

17. The method of claim 16, wherein the attaching step further comprises attaching the indicator arm to the component which is pivotable about a vertical axis relative to a vehicle frame.

18. The method of claim 16, wherein the hanger bracket is pivotable about a vertical axis relative to a vehicle frame in the pivotably mounting step.

19. The method of claim 16, wherein a leveling arm is pivotably mounted to the leveling valve at a first pivot, wherein the indicator arm pivots relative to the leveling arm at a second pivot, and wherein the pivoting step further comprises pivoting the leveling valve relative to the hanger bracket about a third pivot which is positioned longitudinally between the first and second pivots.

20. The method of claim 16, wherein the pivotably mounting step further comprises mounting the leveling valve to an inner side of the hanger bracket, and wherein the pivoting step further comprises operating a detent mechanism mounted to an outer side of the hanger bracket, thereby selecting from among multiple predefined positions of the leveling valve relative to the hanger bracket.

* * * * *